(12) United States Patent
Zhang

(10) Patent No.: US 7,827,702 B1
(45) Date of Patent: Nov. 9, 2010

(54) MEASUREMENT DEVICE

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hong Hai Precision Industry Co., Ltd., Tu-Cheng, Taipei Hsien (TW)

( * ) Notice: Subject to any disclaimer, the term of this patent is extended or adjusted under 35 U.S.C. 154(b) by 7 days.

(21) Appl. No.: 12/493,145

(22) Filed: Jun. 26, 2009

(51) Int. Cl.
*G01B 5/25* (2006.01)
(52) U.S. Cl. .................................................. 33/613
(58) Field of Classification Search ............. 33/501.05, 33/501.08, 567, 613, 645, 783
See application file for complete search history.

(56) References Cited

U.S. PATENT DOCUMENTS

| | | | | |
|---|---|---|---|---|
| 3,869,801 A | * | 3/1975 | Lycan | 33/645 |
| 4,686,769 A | * | 8/1987 | Rock et al. | 33/613 |
| 5,068,976 A | * | 12/1991 | Bell | 33/666 |
| 6,798,955 B2 | * | 9/2004 | Kunkel et al. | 33/645 |
| 2006/0032067 A1 | * | 2/2006 | Orr | 33/501.08 |
| 2009/0038171 A1 | * | 2/2009 | Eckberg et al. | 33/645 |
| 2010/0116964 A1 | * | 5/2010 | Aleo | 33/645 |

\* cited by examiner

*Primary Examiner*—G. Bradley Bennett
(74) *Attorney, Agent, or Firm*—Raymond J. Chew

(57) ABSTRACT

A measurement device for measuring a distance between a center of a through hole defined in a panel and a side of the panel extending from an end of the panel includes a positioning member, a support member, and a measurement member. The positioning member and the measurement member are set on two ends of the support member. An inside surface of the positioning member resists the side of the panel. A distance between the inside surface and a center of the measurement member is about equal to a normal distance between the side and the center of the through hole. If an actual distance between the side and the center of the through hole meets a determined specification, the measurement member will enter into the through hole.

14 Claims, 6 Drawing Sheets

MEASUREMENT DEVICE

BACKGROUND

1. Technical Field

The present disclosure relates to measurement devices, and particularly to a measurement device measuring a distance between a center of a through hole defined in an article and a side of the article.

2. Description of Related Art

In device machining, a punching or bending mode is frequently used. Often, the devices form curved panels, many parts of which can define multiple through holes. To ensure the distance between a center of a through hole defined in a panel and a side of the panel meets determined specifications, a caliper is frequently used. However, due to the complicated operation of the caliper and intrinsic fallibility thereof, measurement precision is lowered.

DETAILED DESCRIPTION

Figure 1:
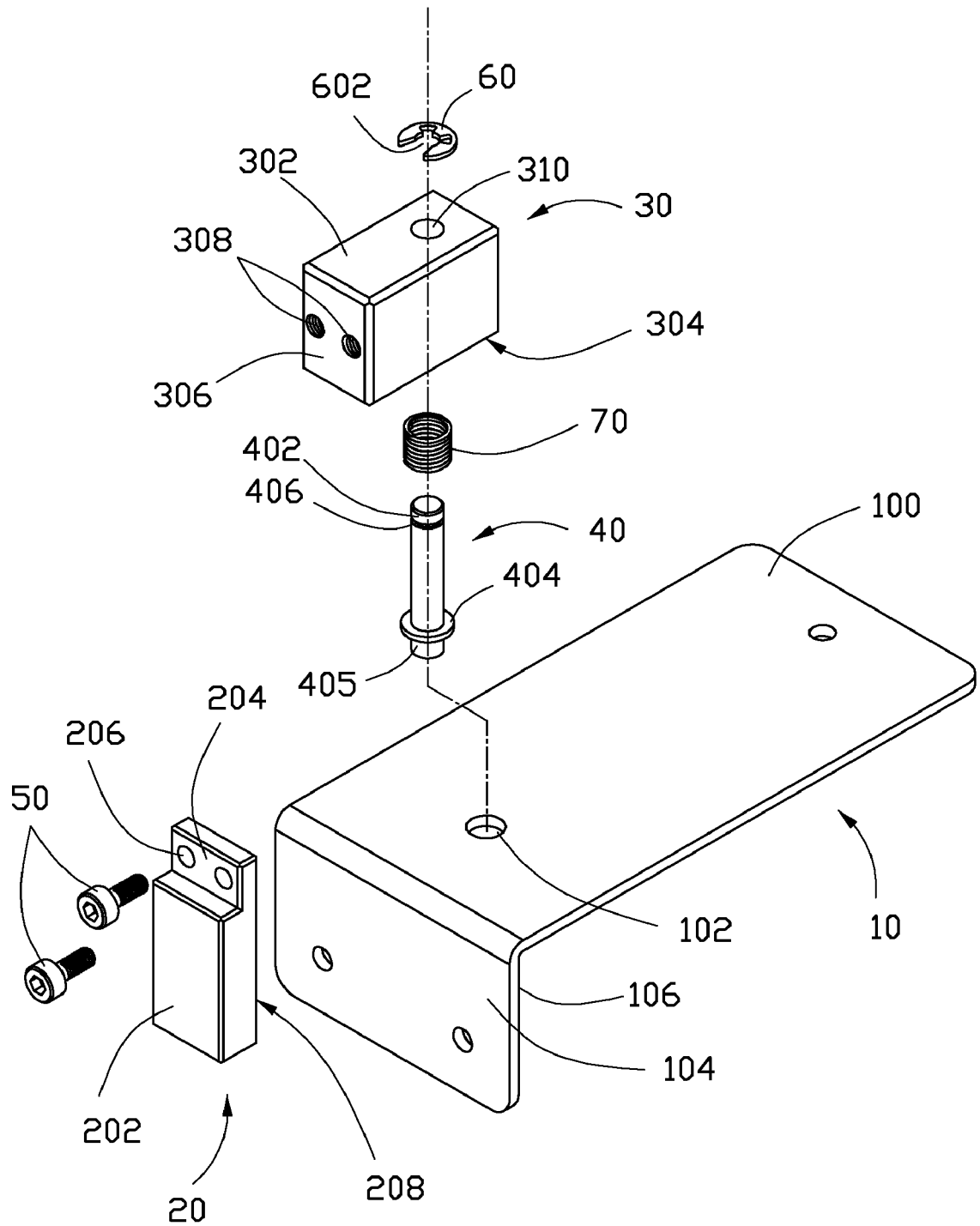
FIG. 1 is an exploded, isometric view of a first exemplary embodiment of a measurement device, together with an article.
Figure 3:
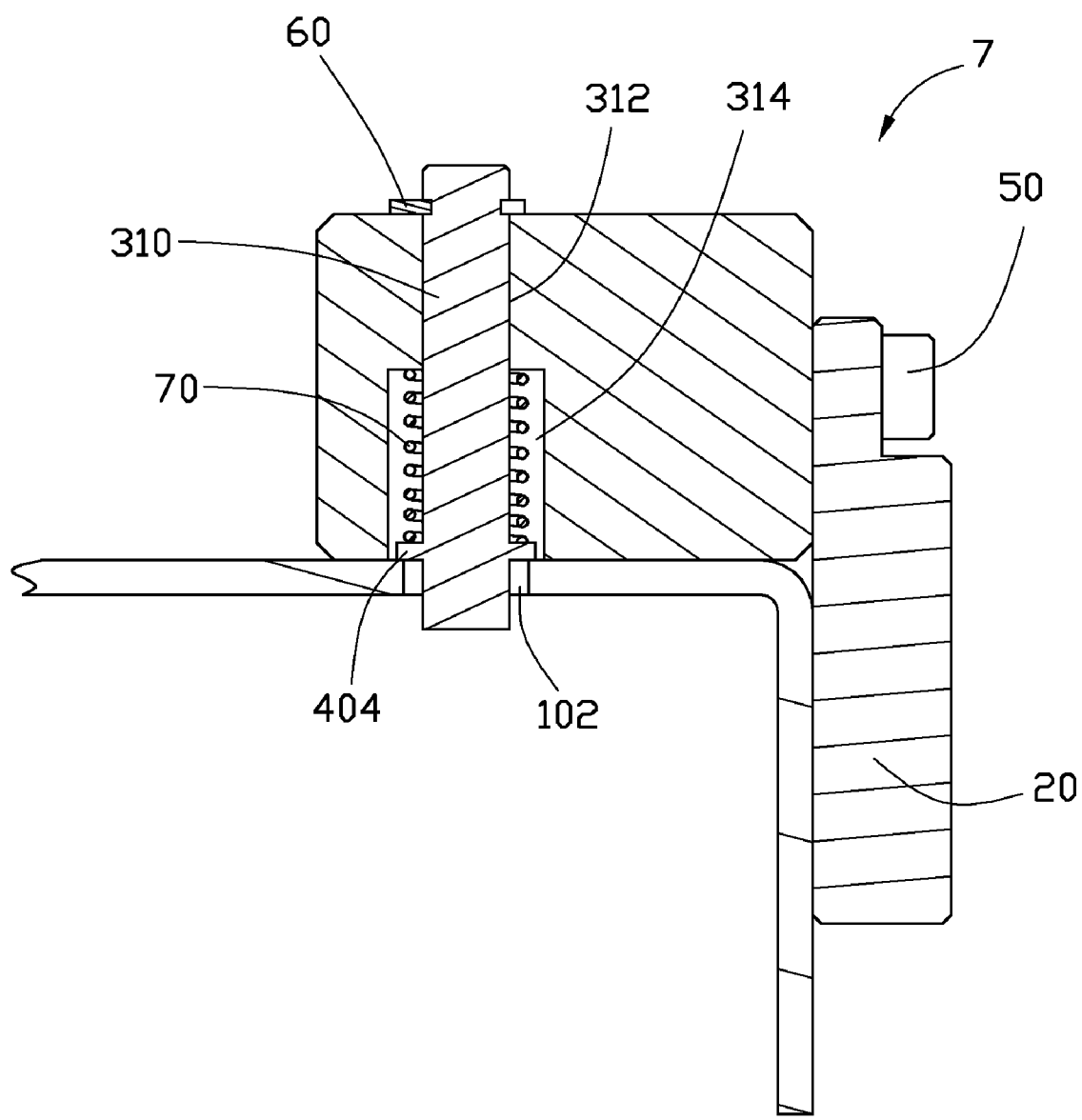
FIGS. 3 and 4 are cross-sections of FIG. 2, taken along the line III-III, but showing different states.

Referring to FIGS. 1 and 3, a first exemplary embodiment of a measurement device 7 determines whether a distance between a center of a through hole 102 defined in a panel 100 and a side 104 of the panel 100 of an article 10 meets a determined specification. The measurement device 7 includes a positioning member 20, a support member 30, a measurement member 40, an elastic element such as a helical spring 70, and a fixing member 60. In this embodiment, the article 10 may be a computer part, although the disclosure is not limited thereto.

The positioning member 20 is stepped, and includes a rectangular main body 202, and a rectangular received portion 204 extending from a top end of the main body 202. The main body 202 is thicker than the received portion 204. The main body 202 includes an inside surface 208. Two fastening holes 206 are defined in the received portion 204, for mounting members, such as two fasteners 50 passing through the fastening holes 206 to fasten the positioning member 20 to the support member 30.

The support member 30 is generally rectangular, and includes a top surface 302, a bottom surface 304 opposite to the top surface 302, and a side surface 306 perpendicularly connected between corresponding ends of the top and bottom surfaces 302, 304. A stepped hole 310 is defined in the support member 30, extending through to the top surface 302 and the bottom surface 304. The stepped hole 310 includes a small hole 312 adjacent to the top surface 302, and a great hole 314 adjacent to the bottom surface 304 and communicating with the small hole 312. Two fastening holes 308 are defined in the side surface 306, for the fasteners 50 passing through the fastening holes 206 and 308 to engage the fastening holes 308, respectively. Therefore, the positioning member 20 is fixed to the support member 30.

The measurement member 40 is cylindrical and includes an upper portion 402 and a lower portion 405 extending from a first end and a second end of the measurement member 40, respectively. An annular securing portion 404 protrudes from a circumference of the lower portion 405. A diameter of the securing portion 404 is less than a diameter of the great hole 314 of the stepped hole 310. A diameter of the upper portion 402 and the lower portion 405 is equal to a diameter of the small hole 312 of the stepped hole 310, and less than a diameter of the through hole 102. An annular groove 406 is defined in a circumference of the upper portion 402. In other embodiments, the upper portion 402 or the lower portion 405 of the measurement member 40 can be other shapes, such as rectangular or tapered. When the distance between the center of the through hole 102 and the side 104 is to be measured, a distance between an axis of the lower portion 405 and the inside surface 208 of the positioning member 20 is set to equal a normal distance between the center of the through hole 102 and the side 104 specified by users in advance. For example, if the diameter "d" of the through hole 102 is about 6 millimeters, the normal distance "L" between the center of the through hole 102 and the side 104 is about 20 mm specified by users in advance, and a permissible error "e" is about 0.5 mm, the diameter "x" of the lower portion 405 can be deduced by a formula of x=d−2*e=6−2*0.5=about 5 mm, indicating that the distance between the center of the through hole 102 and the side 104 meets the determined specification that the distance is within the range of about 20±0.5 mm.

The fixing member 60 is circular and defines an Ω-shaped opening 602 therein to engage the groove 406 of the measurement member 40.

Figure 2:
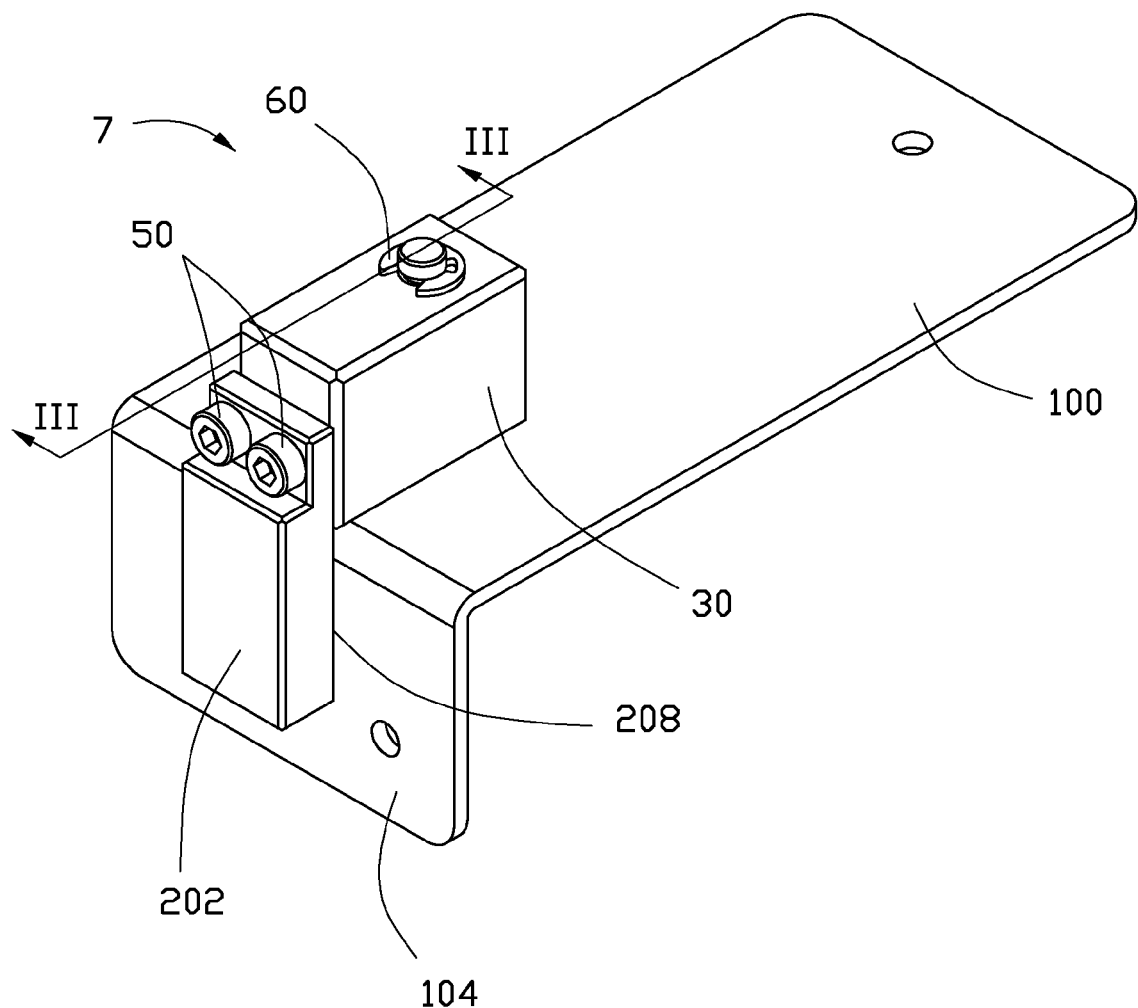
FIG. 2 is an assembled, isometric view of the measurement device and the article of FIG. 1.
Figure 4:
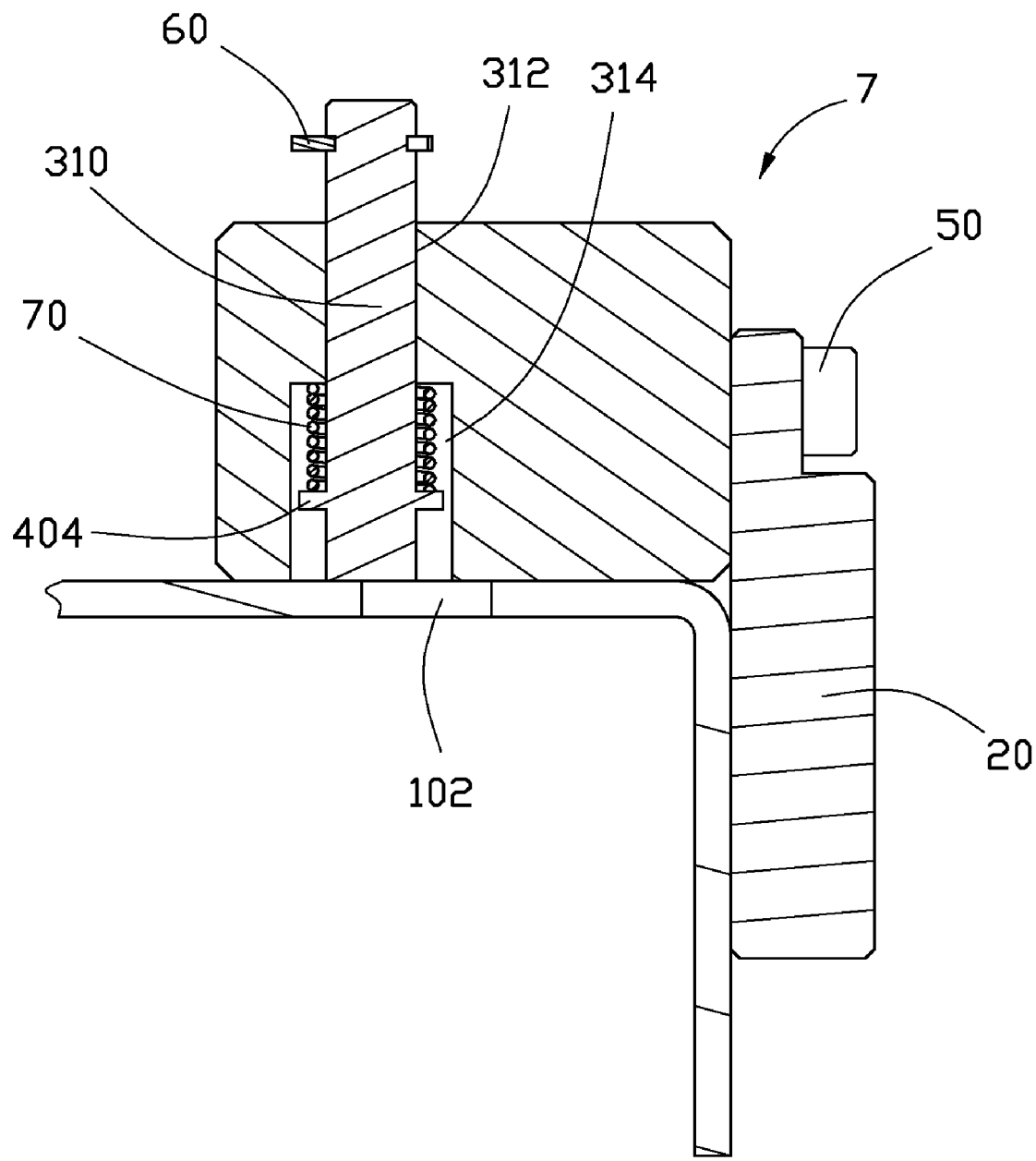

Referring to FIGS. 2 to 4, during assembly, the spring 70 fits about the measurement member 40 and resists the securing portion 404 with a first end of the spring 70. The upper portion 402 of the measurement member 40 passes through the stepped hole 310 from the bottom surface 304 of the support member 30, with the upper portion 402 extending out from the top surface 302. The fixing member 60 resists the top surface 302 of the support member 30 and engages the groove 406 of the measurement member 40, to mount the measurement member 40 to the support member 30. The spring 70 drives a part of the lower portion 405 of the measurement member 40 to extend out from the bottom surface 304 of the support member 30. The inside surface 208 of the positioning member 20 resists the side surface 306 of the support member 30. The fasteners 50 pass through the corresponding fastening holes 206 to engage the corresponding fastening holes 308, thereby fastening the positioning member 20 to the support member 30.

In use, the inside surface 208 resists the side 104 of the article 10, and the measurement member 40 together with the support member 30 is positioned on the panel 100, with a bottom of the lower portion 405 moving on the top surface 302 of the support member 30. If the distance between the center of the through hole 102 and the side 104 meets the determined specification, the spring 70 is restored to drive the lower portion 405 into the through hole 102 as shown in FIG. 3, once the lower portion 405 aligns with the through hole 102. However, if the distance between the center of the through hole 102 and the side 104 does not meet determined specifications, the lower portion 405 cannot enter into the through hole 102 as shown in FIG. 4.

Figure 5:
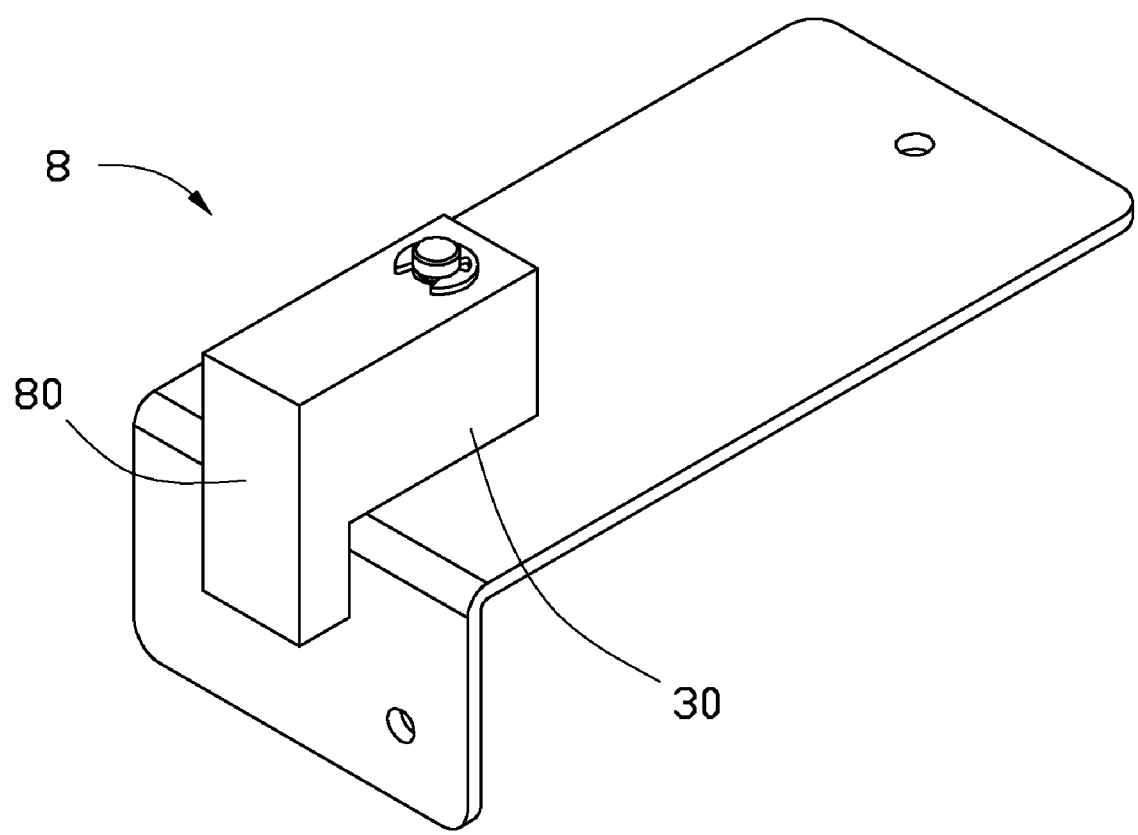
FIG. 5 is an assembled, isometric view of a second exemplary embodiment of a measurement device and an article.

FIG. 5 is a second exemplary embodiment of a measurement device 8, differing from the first embodiment in that a positioning member 80 and a support member 30 are integrally formed, and the positioning member 80 extends vertically from an end of the support member 30.

Figure 6:
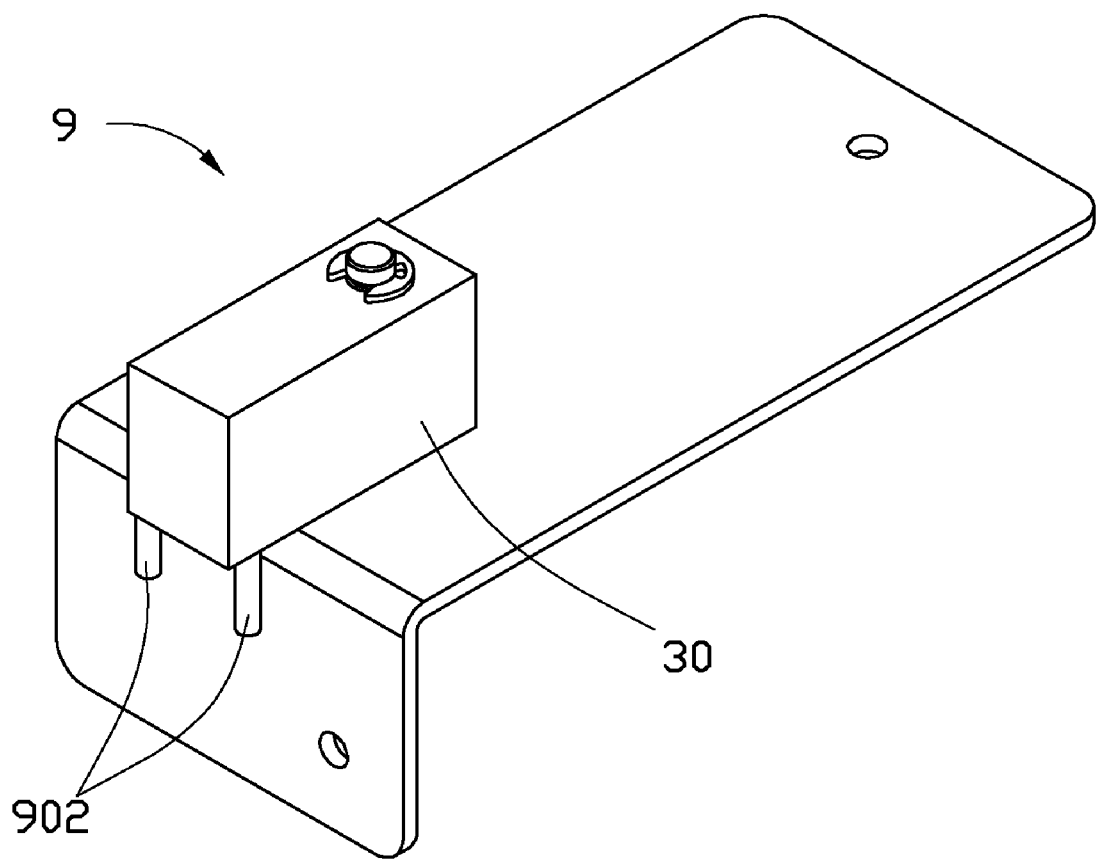
FIG. 6 is an assembled, isometric view of a third exemplary embodiment of a measurement device and an article.

FIG. 6 is a third exemplary embodiment of a measurement device 9, differing from the second embodiment in that a positioning member 902 two cylinders extending vertically from an end of a support member 30.

Referring again to FIG. 1, in other embodiments, measurement of the distance between the center of the through hole 102 and the side 104 can also be achieved by measuring a distance between the center of the through hole 102 and a side 106 opposite to the side 104, and the positioning members 20, 80 and 902 can be omitted. A distance between the center of the lower portion 405 and the side surface 306 is set to equal a normal distance between the center of the through hole 102 and the side 106. For example, if the diameter "d" of the through hole 102 is about 6 mm, the normal distance "L" between the center of the through hole 102 and the side 104 is about 20 mm, the thickness between the side 104 and the side 106 is about 5 mm, the normal distance "L1" between the center of the through hole 102 and the side 106 is about 15 mm specified by users in advance. If the permissible error "e" is about 0.5 mm, a diameter "x" of the lower portion 405 is deduced by the formula of x=d−2*e=6−2*0.5=about 5 mm. In use, operations of the measurement device differ from those of the first exemplary embodiment, besides the side surface 306 resists the side 106 and the bottom surface 304 resists an inside surface of the panel 100, whereby, the side surface 306 works as a positioning member.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A measurement device for measuring whether a distance between a center of a through hole defined in a panel and a side of the panel extending from an end of the panel meets a determined specification, the device comprising:
    a support member;
    a positioning member set on a first end of the support member, and comprising an inside surface to resist the side of the panel; and
    a measurement member set on a second end opposite to the first end of the support member, wherein a distance between the inside surface of the positioning member and a center of the measurement member is substantially equal to a normal distance between the center of the through hole and the side, wherein the measurement member is operable to enter into the through hole in response to an actual distance between the center of the through hole and the side about equal to the normal distance, the measurement member cannot enter into the through hole in response to the actual distance between the center of the through hole and the side unequal to the normal distance.

2. The device of claim 1, wherein the positioning member defines a plurality of fastening holes for a plurality of mounting members passing therethrough to engage the support member.

3. The device of claim 2, wherein the plurality of mounting members are fasteners.

4. The device of claim 1, wherein the support member and the positioning member are integrally formed, and the positioning member extend vertically from an end of the support member.

5. The device of claim 1, wherein the support member comprises a top surface, a bottom surface opposite to the top surface, and a side surface perpendicularly connected between corresponding ends of the top and bottom surfaces, a fixing hole is defined in the support member through the top surface and the bottom surface, and two fastening holes are defined in the side surface to fasten the positioning member to the support member.

6. The device of claim 5, wherein the fixing hole is stepped and comprises a small hole adjacent to the top surface and a great hole adjacent to the bottom surface, wherein the great hole receives an elastic member mounted to the measurement member.

7. The device of claim 6, further comprising a fixing member, wherein the elastic member fits about the measurement member, and the fixing member engages the measurement member to fit the measurement member to the top surface of the support member.

8. The device of claim 6, wherein the measurement member comprises an upper portion and a lower portion extending from opposite ends of the measurement member, a securing portion is formed around the measurement member at the lower portion, to limit the elastic member between the top surface of the support member and the securing portion and a groove is defined in a circumference of the upper portion, to engage the fixing member.

9. The device of claim 8, wherein the fixing member is circular, and defines an Ω-shaped opening to engage the groove of the measurement member.

10. The device of claim 1, wherein a diameter of the measurement member is equal to a diameter of the through hole minus twice of a permissible error.

11. The device of claim 1, wherein the positioning member is two cylinders, and extends vertically from an end of the support member.

12. A measurement device for measuring whether a distance between a center of a through hole defined in a panel and a side of the panel extending from an end of the panel meets a determined specification, the device comprising:
    a support member comprising an inside surface at a first end of the support member, to resist the side of the panel; and
    a measurement member set on a second end opposite to the first end of the support member, wherein a distance between the inside surface of the support member and a center of the measurement member is substantially equal to a normal distance between the center of the through hole and the side, wherein the measurement member can enter into the through hole in response to an actual distance between the center of the through hole and the side equal to the normal distance, wherein the measurement member cannot enter into the through hole in response to the actual distance between the center of the through hole and the side unequal to the normal distance.

13. The device of claim 12, wherein the support member comprises a top surface, a bottom surface opposite to the top surface, and a side surface located at the first side of the support member and perpendicular to the top and bottom surfaces to function as the inside surface, a fixing hole is defined in the support member through the top and bottom surfaces, and two fastening holes are defined in the side surface to fasten the positioning member to the support member.

14. The device of claim 12, wherein the measurement member comprises a securing portion extending from a circumference of a first end of the measurement member, and a groove is defined in a circumference of a second end opposite to the first end of the measurement member.

* * * * *

UNITED STATES PATENT AND TRADEMARK OFFICE
CERTIFICATE OF CORRECTION

PATENT NO. : 7,827,702 B1
APPLICATION NO. : 12/493145
DATED : November 9, 2010
INVENTOR(S) : Bing-Jun Zhang It is certified that error appears in the above-identified patent and that said Letters Patent is hereby corrected as shown below:

Title Page
Please replace Section (73) regarding "Assignees" on the front page of the Patent with the following:

(73) Assignees: Hong Fu Jin Precision Industry (ShenZhen) Co., Ltd., Shenzhen, Guangdong Province (CN); Hon Hai Precision Industry Co. Ltd., Tu-Cheng, Taipei Hsien (TW).

Signed and Sealed this
First Day of February, 2011

David J. Kappos
*Director of the United States Patent and Trademark Office*